Nov. 22, 1955  O. J. ASKVIKEN ET AL  2,724,226
POTATO HARVESTING, DEVINING AND SEPARATING DEVICE
Filed Sept. 17, 1952  8 Sheets-Sheet 1

INVENTORS
Magnus Peterson &
BY Olav J. Askviken

McMorrow, Berman + Davidson
Attorneys.

Nov. 22, 1955   O. J. ASKVIKEN ET AL   2,724,226
POTATO HARVESTING, DEVINING AND SEPARATING DEVICE
Filed Sept. 17, 1952   8 Sheets-Sheet 2

INVENTORS
Magnus Peterson
Olav J. Askviken
BY
McMorrow, Berman + Davidson
Attorneys.

Nov. 22, 1955     O. J. ASKVIKEN ET AL     2,724,226
POTATO HARVESTING, DEVINING AND SEPARATING DEVICE
Filed Sept. 17, 1952     8 Sheets-Sheet 8

INVENTORS
Magnus Peterson
BY Olav J. Askviken &
McMorrow, Berman + Davidson
Attorneys.

United States Patent Office 2,724,226
Patented Nov. 22, 1955

2,724,226

POTATO HARVESTING, DEVINING AND SEPARATING DEVICE

Olav J. Askviken, Northwood, and Magnus Peterson, Kempton, N. Dak.

Application September 17, 1952, Serial No. 310,086

4 Claims. (Cl. 55—51)

This invention relates to an apparatus particularly designed for harvesting potatoes. More particularly, the invention has reference to a mobile machine adapted to be drawn by a traction vehicle, or self-powered, the machine constituting the present invention being adapted to dig the potatoes, process them through a de-vining means, clean and dry the potatoes while effecting their full separation from pieces of vine and other debris, and load the potatoes in bulk upon an associated vehicle.

The broad object of the present invention is to provide a generally improved, self-contained apparatus constructed as a plurality of compactly arranged, cooperating assemblies mounted upon a single mobile frame.

A further important object is to provide, in an apparatus of the character referred to, an improved pick-up means which will be effective to uproot and expose the potatoes on movement of the apparatus along a row, said pick-up means being so designed as to be positioned at adjusted elevations relative to the ground surface, and being also adapted to convey to a predetermined location on the apparatus all the potatoes and vines dug, with a minimum of wastage.

Another specific object of the invention is to provide, in association with said pick-up conveyor means, a de-vining attachment through which the potatoes and vines will be processed, after being dug, said de-vining attachment being novelly designed in a manner to accomplish a primary, main separation of the potatoes and the vines.

Another object of importance is to provide a dirt and vine separator drum rotatably mounted on the apparatus, and specifically formed in a manner that will accomplish a secondary or final separation of the potatoes from the dirt and vine fragments carried therewith, said drum being adapted for adjustable positioning to aid the separating action thereof, and to aid further, travel of the potatoes longitudinally of the drum during rotation of the same.

Another object of importance is to provide a bulk loading conveyor adapted to receive the cleaned potatoes from the drum, said conveyor being specifically formed in a manner to elevate the cleaned potatoes, and discharge them at selected elevations, into the box of an accompanying truck or like vehicle.

Still another object of importance is to provide air blower means which is novelly designed in such a way as to cause cool air to be blown upon the potatoes, while the potatoes are being processed through the de-vining attachment, and warm air to be blown through the separator drum, for drying the potatoes and vines and aiding the separating action of the drum.

Yet another object of the invention is to provide an improved drive means for the several component assemblies mentioned above, which drive means will be powered from a single prime mover, and will be adapted to drive the several conveyors, the de-vining attachment, and the separator drum simultaneously, at predetermined speeds relative to one another.

Other objects will appear from the following description, the claims appended thereto, and from the annexed drawings, in which like reference characters designate like parts throughout the several views, and wherein:

The potato harvesting apparatus constituting the present invention includes a main frame, which we have designated generally by the reference numeral 30. The main frame 30 supports all the other parts of the apparatus, and is rollably mounted, so as to permit the apparatus to travel along a row of hills.

The main frame is preferably of I beam or channel formation throughout, and includes a pair of elongated, parallel side rails 32 of channeled formation. Disposed medially between the side rails 32, and extending in parallelism with the side rails, is a middle rail 34. A front cross member 36 (Figure 2) extends between and rigidly connects the front ends of the side and middle rails, and a rear cross member 38 extends between and rigidly connects the rear ends of said rails.

From the above, it will be seen that the main frame is horizontally disposed, and is formed as a flat, open, rectangular support for the remaining assemblies of the apparatus.

Integral or otherwise made rigid with the front ends of the side rails 32 are forwardly converging side rail portions 40, said portions being fixedly connected at their convergent ends, by a clevis means designated generally at 42, whereby the entire apparatus can be attached to a traction vehicle, such as a truck or tractor.

Intermediate the opposite ends of the side rails 32, said side rails are provided with bearings for the axle of ground wheels 44, the main frame being thus rollably mounted.

Figures 22, 23, 24, 25, 26:
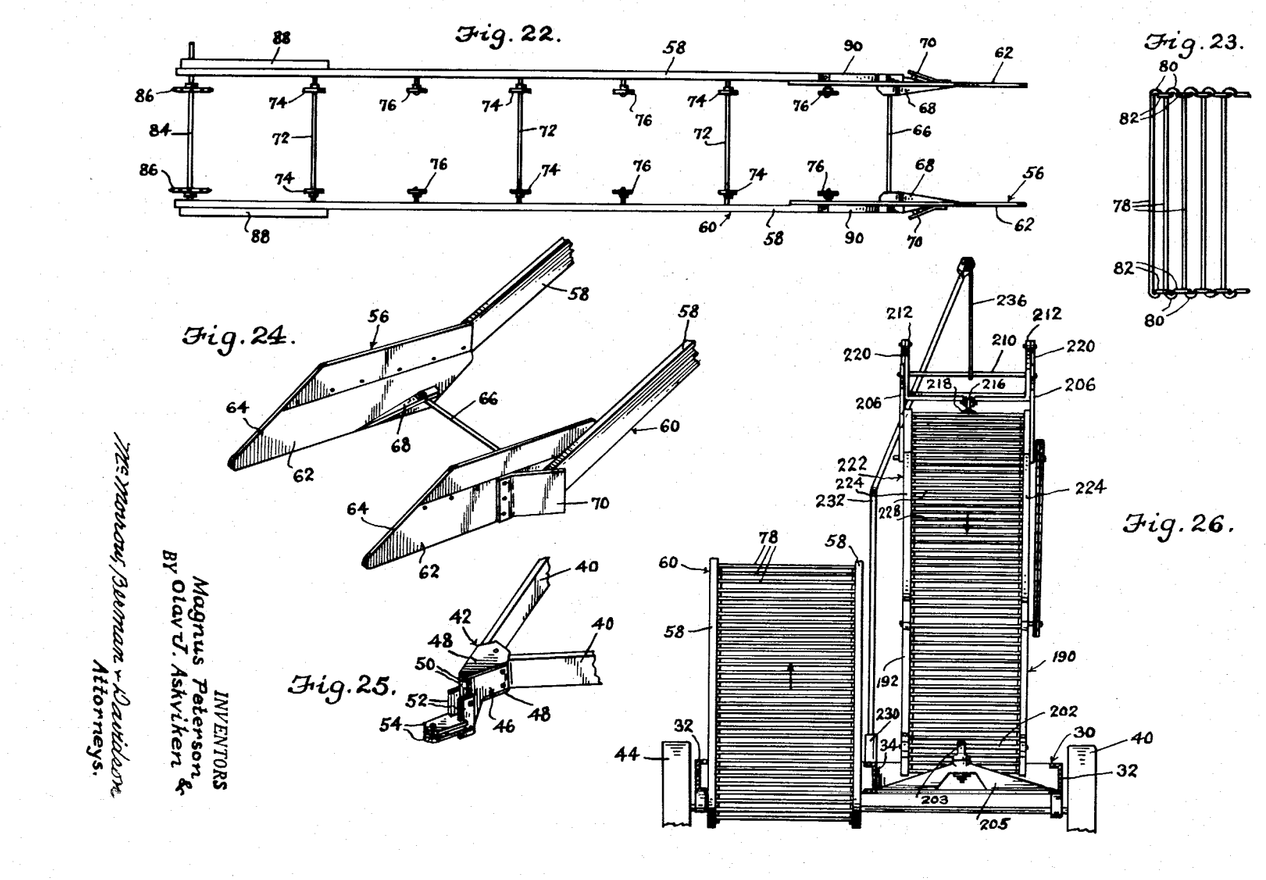
Figure 22 is a top plan view of the pick-up conveyor per se, the conveyor belt being removed.
Figure 23 is a fragmentary top plan view of the conveyor belt used on the conveyor of Figure 22.
Figure 24 is a fragmentary perspective view of the lead end of the pick-up conveyor, showing a plow means used to uproot the potatoes.
Figure 25 is a fragmentary perspective view showing the front end of the main frame, and illustrating the means whereby the apparatus is attached to a traction vehicle.
Figure 26 is an elevational view of a hoist used to elevate the bulk loading conveyor and position the same in an inoperative location, when the apparatus is being moved from place to place.

Considering the particular construction of the clevis means 42, it will be noted from Figure 25 that said means includes a pair of side plates 46 rigidly connected to the front ends of the respective frame portions 40, said plates 46 being secured fixedly to top and bottom plates 48, the plates 48 being welded or otherwise fixedly attached to the frame portions 40.

In the front edges of the plates 46, there is provided a series of openings 50, any of which can be selectively adapted to receive connecting bolts passing through the upstanding plate members 52 of a pair of vertically spaced, horizontally disposed clevis members 54. The members 54 are adapted to receive a pin or the like, not shown, whereby the device can be secured to a traction vehicle, also not shown.

The construction of the pick-up conveyor will now be described, said conveyor being best shown in Figures 1, 2, 22, 23 and 24. The pick-up conveyor is inclined longitudinally of the apparatus, at one side of the apparatus, and at its lower or leading end, is equipped with a plow means designated generally at 56. The plow means 56 is attached to the front ends of forwardly and downwardly inclined side frame members 58 of the pick-up conveyor, said pick-up conveyor being designated generally at 60.

The plow means 56 includes a pair of forwardly pointed, vertically disposed shares 62, having beveled leading edges 64, thus to permit said shares or blades to cut through the ground surface G at opposite sides of the hills of a row of potatoes to be harvested, thus to loosen said hills and permit the potatoes and their associated vines to be readily uprooted.

Fixedly connecting and extending transversely between the rear edges of the blades 62 is a brace rod 66, said brace rod being positioned above the bottom edges of the blades 62.

The rod 66 is adapted to move through the hills, thus to uproot the potatoes and vines inclosed therein, and lift the same onto the lead end of the pick-up conveyor 60. To insure the efficient action of the rod 66, elongated, forwardly tapered shields 68 are fixedly secured to the inner surfaces of the blades 62, said shields 68 being inclined upwardly over the opposite ends of the rod 66.

Secured fixedly to the outer surfaces of the blades 62 are laterally and obliquely extended deflectors 70, which deflect dirt away from the front ends of the conveyor side frame members 58.

As will be noted from Figure 22, the pick-up conveyor 70 is provided, at locations spaced longitudinally thereof, with shafts 72, said shafts extending between the members 58 and having idlers 74 rollably mounted thereon. The idlers 74 permit the mounting of a suitable conveyor belt, to be described immediately hereinafter.

The lead pair of rollers constitutes a pair of shakers 76, said shakers serving to impart a vibratory or agitating motion to the potatoes and vines, immediately after said potatoes are picked up by the lead end of the conveyor.

The construction of the conveyor belt is illustrated in Figure 23, and as will be noted, said conveyor belt is formed as a plurality of closely spaced, parallel cleat bars 78, said bars 78 being formed with hook ends 80 engaged in links 82. The bars 78 will, during operation of the apparatus, cause the potatoes and vines to be carried upwardly to the discharge end of the conveyor 60, and it may be noted that at this point, there is no basic separation of the potatoes and vines. Rather, a substantial amount of the dirt lifted onto the conveyor 60 is shaken loose from the potatoes and vines, and passes between the open spaces provided between the bars 78.

The conveyor belt is driven from a conveyor drive shaft 84, located at the discharge or rear end of the pick-up conveyor, said conveyor drive shaft being provided with drive sprockets 86.

To support the rear end of the conveyor at a desired elevation, support frames 88 are provided, one of said frames being disposed at each side of the pick-up conveyor, at the rear end thereof. The drive shaft 84 extends through the upper ends of the support frames, and it will be understood that said frames will be respectively supported upon one of the side rails 32, and the middle rail 34.

Figures 1, 3, 4, 5, 6, 7:
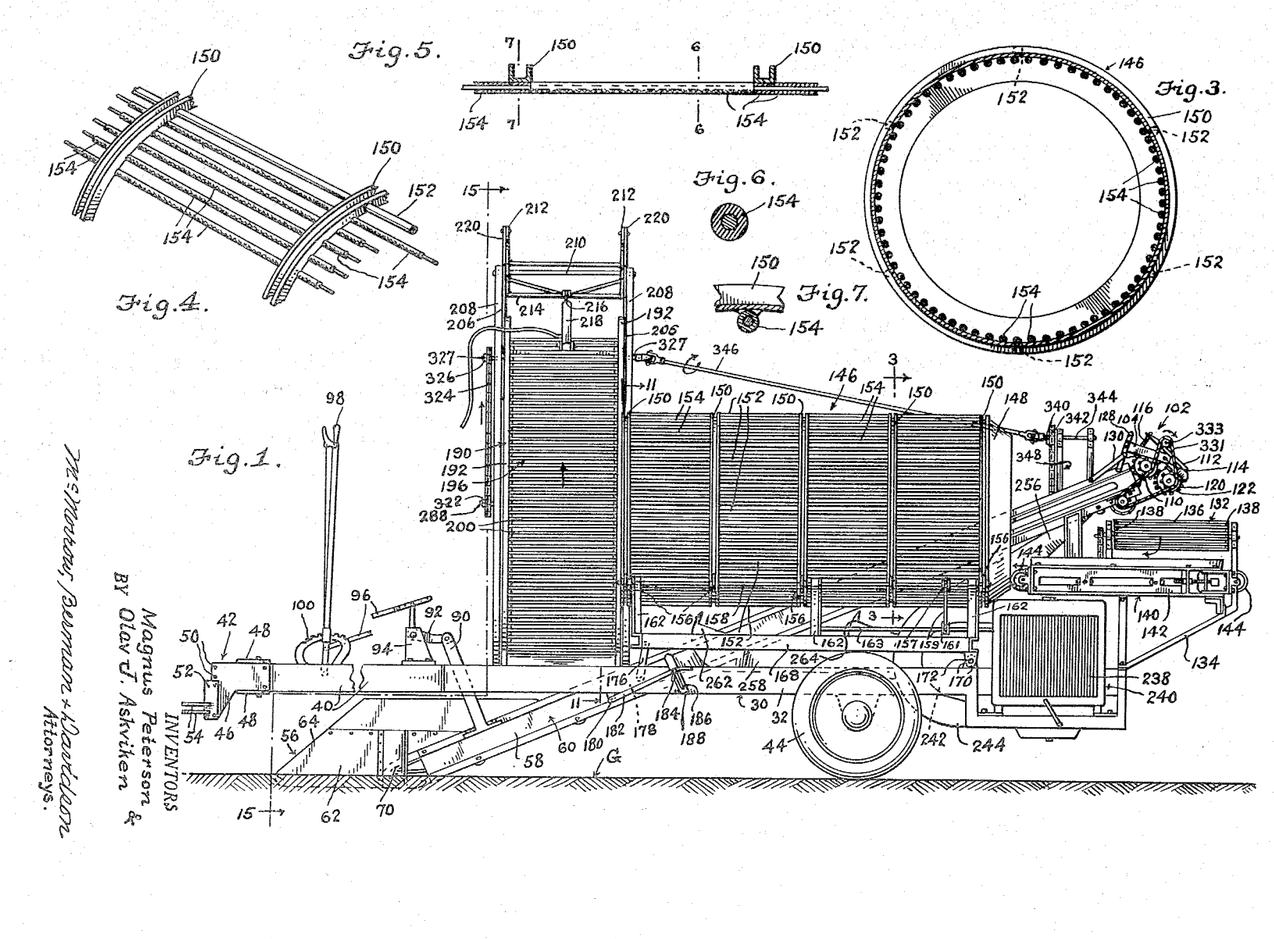
Figure 1 is a side elevational view of a potato harvesting apparatus formed in accordance with the present invention.
Figure 3 is an enlarged transverse sectional view through the dirt and vine separator drum, taken substantially on line 3—3 of Figure 1.
Figure 4 is a still further enlarged, fragmentary perspective view of the drum, showing the details of the construction thereof.
Figure 5 is a fragmentary, longitudinal sectional view through a portion of the drum.
Figure 6 is a transverse sectional view through one of the slats or rods of the drum, taken on line 6—6 of Figure 5, the scale being greatly enlarged.
Figure 7 is a sectional view on line 7—7 of Figure 5.

Means is provided for adjusting the elevation of the inlet end of the pick-up conveyor, relative to the ground surface, said means being illustrated to its best advantage in Figure 1. The means includes a pair of standards 90 bolted or otherwise rigidly secured at their lower ends to the front end portions of the side frame members 58 of the pick-up conveyor, the standards 90 extending normally to the side frame members. To the upper ends of the respective standards 90, there are pivotally connected the rear ends of forwardly projecting, angular levers 92, said levers 92 being pivotally attached, intermediate their ends, to upstanding brackets 94 mounted upon the main frame. The angular levers 92 are of the bell crank type, and have upwardly extending legs pivotally attached to the rear ends of elongated links 96. As will be noted from Figure 1, the rear ends of the links 96 are each provided with a longitudinal series of apertures, for adjustable connection of the links to the bell cranks. The links 96 have a connection, at their front ends, to an intermediate portion of a pivoted handle 98, the handle 98 being pivotally mounted upon the main frame for swinging movement in a vertical plane. The handle 98 is equipped with a spring loaded detent or latch, engageable in a selected notch of a locking segment 100 fixedly mounted upon the main frame.

It will be noted from the construction described above that the handle 98 can be adjustably positioned relative to its associated segment 100. When the handle is so positioned, it will position at a desired elevation the forward or leading end of the pick-up conveyor, thus to permit the pick-up conveyor to be properly disposed relative to the hills of potatoes on which it is to act.

After the potatoes and vines have been carried to the discharge end of the conveyor, they are processed through a de-vining means designated generally at 102. The de-vining means has been shown in detail in Figures 8–10, and as will be noted, said means includes a pair of parallel mounting plates 104, said plates having slots 106 at their forward ends adapted to receive bolts or equivalent fastening elements, whereby the plates 104 are connected to the rear ends of the side frame members 58 of the pick-up conveyor 60.

Figures 2, 8, 9, 10:
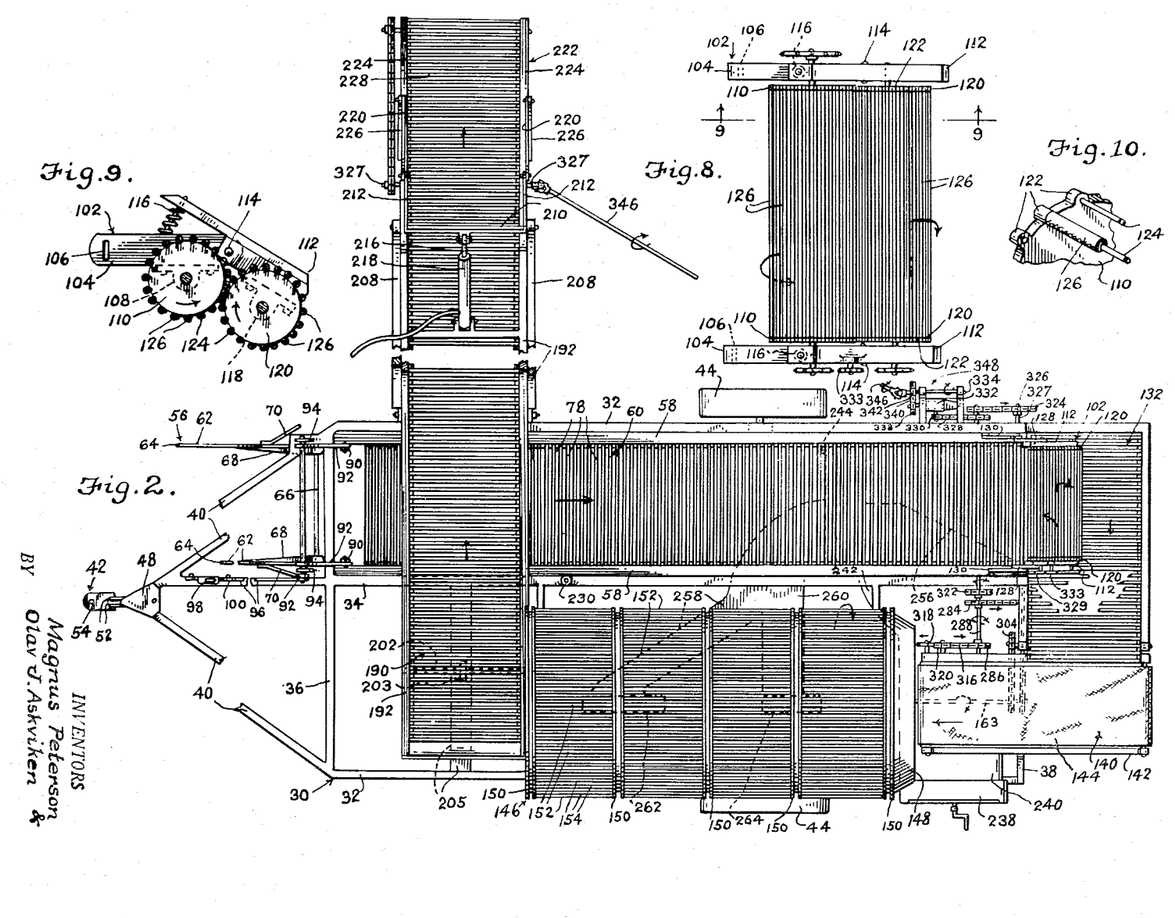
Figure 2 is a top plan view, portions being broken away.
Figure 8 is a top plan view of the de-vining attachment.
Figure 9 is a transverse sectional view through said attachment, taken on line 9—9 of Figure 8.
Figure 10 is a fragmentary perspective view of one of the rollers of the de-vining attachment.

The mounting plates 104 are each provided with a depending bearing 108, and journaled at its opposite ends in the bearings 108 is a shaft having rigidly secured thereto transversely spaced discs 110.

Support arms 112 are pivotally connected at 114, at their front ends, to the rear ends of the respective mounting plates 104, and are spring pressed downwardly by means of springs 116 interposed between the arms 104, 112 respectively. Bearings 118 are secured to the undersides of the arms 112, and journaled in the bearings 118 are the opposite ends of a second shaft, carrying discs 120.

Secured to the pair of discs 110 and the pair of discs 120, are rods, that form, in cooperation with their associated discs, de-vining rollers. As will be noted from Figure 10, each disc has integrally formed thereon a circumferential series of spaced sleeves 122, said sleeves receiving the ends of rods 124 that are covered with rubber as at 126, to prevent damage to the potatoes.

The rubber covered rods 124 of the respective de-vining rollers are in mesh with one another, as shown in Figure 9, and it will thus be seen that when one of the shafts of the rollers is driven by a suitable source of power, the rollers will rotate oppositely to one another.

As will become apparent hereinafter, an air blast is directed against the de-vining means 102, to cause the vines, which are substantially lighter than the potatoes, to be blown upwardly between the meshing rollers, as a result of which said rollers lift the vines, and pull them away from the potatoes, to effect a primary separation of the potatoes and vines. The spring loaded roller assembly, in this connection, permits one of the rollers to yield, when the vines are particularly dense or heavy, thus to prevent damage to the de-vining attachment.

To mount the de-vining means 102 in a desired position relative to the pick-up conveyor, we utilize upwardly extended, inclined mounting bars 128 (Figure 1), said bars being each provided with a longitudinal series of apertures receiving the bolt that extends through the slot 106. The bars 128 are supported in proper position, upon the rear ends of the side frame members 58 of the pick-up conveyor, by braces 130.

A cross conveyor has been designated generally at 132 (Figures 1 and 2), the cross conveyor being of the slatted, apron type illustrated in Figure 23. The cross conveyor 132 extends transversely of the rear end of the apparatus, and receives the potatoes from the discharge end of the pick-up conveyor, after the potatoes and vines have been processed past the de-vining means 102.

The cross conveyor 132 is mounted upon a suitable cross conveyor frame 134 rigidly supported upon the rear end of the main frame 30, and includes a slatted conveyor belt 136 formed similarly to that shown in Figure 23. The conveyor belt 136 is mounted upon rollers 138, said rollers being analogous to the rollers of the pick-up conveyor (see Figure 22).

After the potatoes and the remaining vines have been discharged from the cross conveyor 132, they drop to the lead end of a drum loading conveyor designated generally at 140. The drum loading conveyor has a belt of impervious, rubber material, as distinguished from the belt or apron 136 of the cross conveyor.

The drum loading conveyor is mounted upon a suitable set of rollers journaled upon a drum loading conveyor frame 142, the conveyor frame 142 constituting an extension of the frame 134, and being rigidly mounted upon the rear end of the main frame.

The belting of the drum loading conveyor has been designated at 144, and as will be noted from Figure 2, the drum loading conveyor will convey the potatoes and the remaining vines in the direction of the arrow shown in Figure 2, to the inlet end of a dirt and vine separator drum 146.

The particular construction of the drum 146 is of importance, and as will be noted, the drum is of substantial size, being arranged longitudinally of that side of the main frame opposite from the side along which the pick-up conveyor extends. This provides a compact assembly, wherein the over-all width of the apparatus is reduced to a minimum, considering the operating characteristics of the component assemblies of said apparatus.

At its inlet end, the drum is formed with a tapered mouth 148, and spaced longitudinally of the drum are concentric, aligned rings 150.

The rings 150 are of channeled formation (Figure 4), and are fixedly secured in the desired spaced relationship thereof by spacers or connecting rods 152, said rods extending longitudinally of the drum and being spaced selected distances apart, circumferentially of the drum. At their opposite ends, each rod 152 is welded or otherwise fixedly secured to the rings 150 connected thereby, and thus a rigid drum frame is provided, having circumferential channels at a plurality of locations spaced longitudinally thereof.

In the spaces between the connecting rods 152, we utilize separating rods 154, said rods extending through a circumferential series of apertures formed in the rings 150. The rods 154 are rubber covered, to prevent damage to the potatoes fed into the drum.

The drum is power driven, and when it is rotated, the potatoes and vines fed thereto from the conveyor 140 will be agitated to an extent sufficient to cause the vines and dirt to be effectively separated from the potatoes, the dirt and vines dropping through the spaces between the rods 154. In this connection, the particular spacing of the rods 154 is of importance, and it will be obvious that if the rods 154 are spaced too closely together, they will not act efficiently in separating the dirt and vines from the potatoes. If, however, the rods 154 are spaced too far apart, smaller potatoes will be lost, this also being undesirable. Accordingly, the spacing of the rods is selected so as to prevent the loss of potatoes, while still assuring the separation of vine fragments and other debris fed into the separator drum with the potatoes.

To provide for the rotatable mounting of the drum, we utilize rollers 156 (Figures 11 and 12), there being a series of rollers extending longitudinally of each side of the drum. Each of said longitudinal series of rollers is mounted upon a shaft 158.

The shafts 158 are provided (Figure 12) with pulleys 157, about which is trained a drum drive belt 159.

Figures 11, 12, 13, 14:
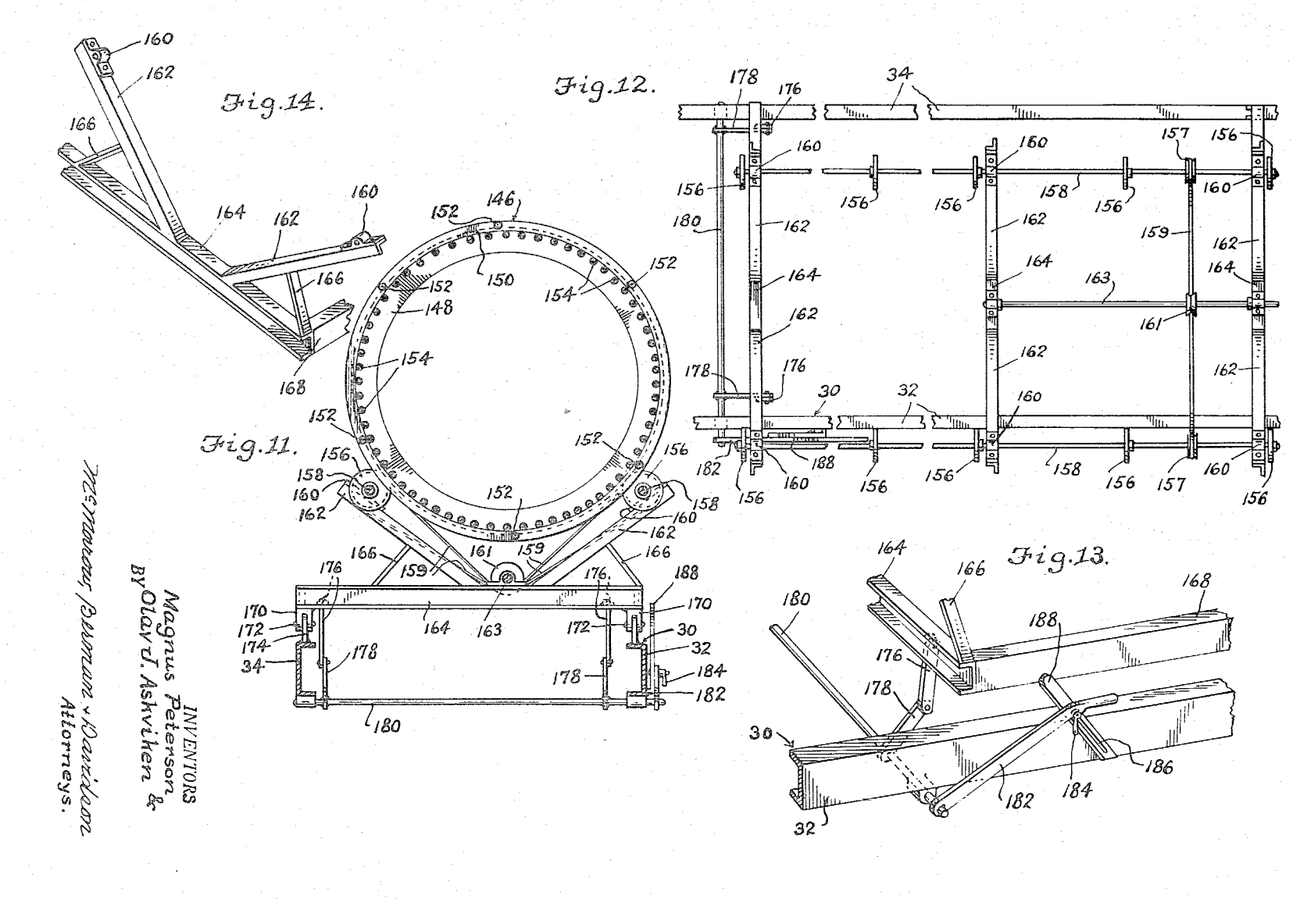
Figure 11 is an enlarged sectional view taken on line 11—11 of Figure 1, showing the drum and drum carriage in end elevation.
Figure 12 is a top plan view, portions being broken away, of the drum carriage.
Figure 13 is an enlarged, fragmentary perspective view of the drum carriage and of a portion of the main frame of the apparatus, showing the means for adjusting the drum carriage as to elevation.
Figure 14 is a fragmentary perspective view of the drum carriage, showing one end of the same, portions being broken away.

The belt 159 is trained about a drum drive pulley 161, secured to a shaft 163 rotatably journaled in bearings carried by the cross members 164. The means for driving shaft 163 will be described hereinafter.

The shafts 158 are journaled in bearings 160 provided upon the outer ends of downwardly converging drum support bars 162, the lower or convergent ends of said bars being welded or otherwise fixedly secured to the intermediate portions of cross members 164 spaced longitudinally of the drum. The cross members 164 are provided with angular braces 166, said braces being rigidly connected to the cross members 164 and the support bars 162. The braces rigidify the connection of the support bars to the cross members 164, and support the bars 162 in proper position, so as to cause the rollers 156 to ride within the channels of the rings 150.

By reason of this arrangement, the rollers 156 will act as gears, by reason of their frictional engagement with the rings 150, thus to cause rotation of the drum 146.

Fixedly connecting the ends of the respective cross members are longitudinal members 168 (Figure 13).

The members 164, 168, 162 and 166 constitute a drum carriage on which the drum 146 is rotatably mounted, and we provide means whereby said carriage can be adjustably positioned to tilt the drum longitudinally. To this end, depending, bifurcated brackets 170 (Figures 1 and 11), are rigidly secured to the rear ends of the longitudinal members 168 of the drum carriage, said brackets receiving pivot pins 172, which pins extend through upstanding ears 174 rigidly mounted upon the main frame.

It will be seen that by reason of this construction, the drum carriage is hinged at its rear end upon a horizontal axis extending transversely thereof, thus to permit the front end of the drum carriage to be swung upwardly or downwardly to selected positions of adjustment.

To permit the adjustment of the front end of the carriage to selected positions, we utilize depending links 176 (Figures 11 and 13), said links 176 being connected to the forwardmost of the cross members 164, and extending downwardly from their associated cross member. Pivotally connected to the lower ends of the links 176 are cooperating links 178, the links 176, 178 acting as toggles. At their lower ends, the links 178 are rigid with a rock shaft 180, said rock shaft being journaled upon and extending transversely of the main frame. One end of the rock shaft has rigidly connected thereto an adjusting handle 182, said adjusting handle 182 being provided with a clamping screw 184 extending through the longitudinal slot 186 of a guide bar 188 pivotally mounted upon one of the side rails 32.

When it is desired to adjust the front end of the drum carriage upwardly or downwardly, to provide for a corresponding adjustment of the front end of the drum 146, one need only grasp the handle 182, and swing said handle upwardly or downwardly, as the case may be. After the carriage has been positioned in a selected location, the clamping screw 184 is tightened, to preserve the adjustment.

The purpose of the adjustable positioning of the drum 146 is to assure the travel of the potatoes longitudinally of the drum, from right to left in Figure 1. Further the adjustable tilting of the drum in the direction of its length aids in the separation of the potatoes and the remaining debris fed into the drum therewith.

When the potatoes are discharged from the drum, they drop to the lower, lead end of a bulk loading conveyor designated generally at 190. The bulk loading conveyor extends transversely of the apparatus, at the front end of the main frame (see Figure 2) and projects laterally beyond one side of the frame, so as to discharge the cleaned potatoes into the box of a suitable vehicle, not shown.

The bulk loading conveyor includes a pair of elongated, parallel side rails 192, equipped with idler rollers 194 (Figure 16), on which a conveyor chain 196 is mounted. The endless conveyor chain 196 is so formed as to carry potatoes upwardly, without danger of said potatoes rolling off the bulk loading conveyor, and to this end, the conveyor chain is equipped with transversely extending, flat bars 198 alternating with raised bars 200. The raised bars 200 can be of any suitable shape, to provide cleated formations, and can, for example, be polygonally formed so far as their cross sectional configuration is concerned.

Figures 15, 16, 17, 17A:
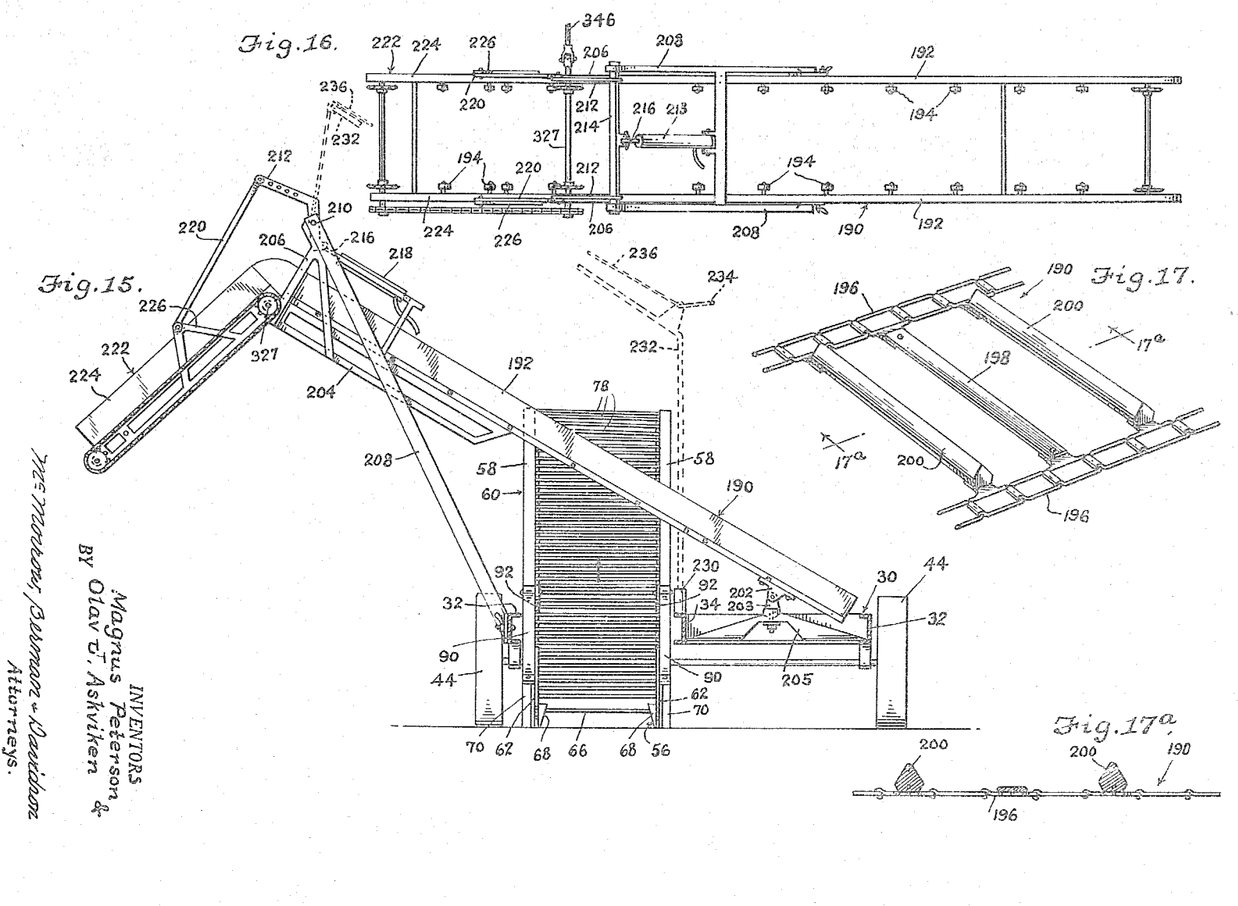
Figure 15 is a transverse sectional view through the apparatus taken substantially on line 15—15 of Figure 1, and illustrating the bulk loading conveyor in side elevation.
Figure 16 is a top plan view of the bulk loading conveyor, the conveyor chain thereof being removed.
Figure 17 is an enlarged, fragmentary perspective view of the conveyor chain of the bulk loading conveyor.
Figure 17a is a sectional view taken on an enlarged scale, on line 17a—17a of Figure 17.

The bulk loading conveyor is pivotally hinged, at its lower end, to the main frame (see Figure 15). To this end, depending bearings are provided at the lower ends of the side rails 190, adjacent the discharge end of the drum, said bearings receiving a hinge pin 202 mounted upon the main frame. To provide for the desired mounting of the hinge pin 202 upon the main frame, there is utilized a support member for the hinge pin, said support member being designated by the reference numeral 203 and having in a transverse opening receiving the mid-length portion of the hinge pin. The support member 203 is mounted for rotation about a vertical axis upon a support plate 205 rigidly mounted upon the main frame 30. This construction, as will be appreciated, permits the bulk loading conveyor not only to swing upwardly and downwardly upon a horizontal axis, but also permits said conveyor to be swung either to an operative position (see Figure 2) in which the bulk loading conveyor projects laterally of the apparatus, or to an inoperative position, in which the bulk loading conveyor is swung to a position parallel to the direction of travel of the machine (see Figure 26).

At the upper ends of the side rails 192, we provide an open reinforcing frame 204, and secured fixedly to the frames 204, at opposite sides of the bulk loading conveyor, are upstanding, triangular frames 206.

To hold the discharge end of the bulk loading conveyor at a desired elevation, we utilize elongated, inclined supports 208, secured at their lower ends to the main frame, and provided at their upper ends with a transversely extending pivot shaft 210, said pivot shaft 210 extending through the upper ends of the bracing frames 206. The supports 208 are removable, when the bulk loading conveyor is to be swung to the position thereof shown in Figure 26.

Pivotally mounted upon the shaft 210 are bell cranks 212, said bell cranks being fixedly connected by a bight 214 (Figure 1), extending transversely therebetween.

Pivotally attached to the mid-length portion of the bight 214 is a piston rod or ram 216 of a hydraulic cylinder 218, said hydraulic cylinder being provided with pressure fluid under the control of an operator, thus to swing the bell cranks 212 upwardly or downwardly, as desired.

The outer ends of the bell cranks 212 are each formed with a longitudinal series of apertures, through any selected one of which a pivot bolt can be extended, whereby to connect to the bell cranks links 220. The links 220 are pivotally connected to an extension conveyor 222, the conveyor 222 having side rails 224 to which are rigidly secured the triangular brace frames 226. The links 220 are pivotally connected to the brace frames 226, and it will be appreciated that the extension conveyor 222 can be swung to selected positions of inclination relative to the bulk loading conveyor 190, by the hydraulic means mentioned above. The conveyor chain 196, in this connection, extends not only along the bulk loading conveyor 190, but is continuously extended through the length of the extension conveyor 222.

Thus, the extension conveyor 222, as will be noted from Figure 2, is provided with cleats 228, which will convey the cleaned potatoes to the vehicle in which said potatoes are to be loaded.

Means is provided for swinging the bulk loading conveyor to in inoperative position, so as to prevent said conveyor from interfering with normal movement of the apparatus from place to place. This means is illustrated in Figure 26, and includes a tubular socket 230 secured to the main frame 30. Positioned rotatably in the socket 230 is an elongated, angular post 232, the post 232 being equipped, intermediate its ends, with a manually rotatable crank 234. The crank 234 rotates a winch or drum, about which is wound a cable 236, said cable being trained about a sheave at the upper end of the post and being connected to the upper end of the bulk loading conveyor 190.

It will be seen that the boom or post 232 when swung rotatably within the socket 230, can be utilized to swing the bulk loading conveyor into a position in which said conveyor is parallel with the longitudinal center line of the apparatus.

The apparatus includes, in addition to the separating and conveying means so far described, a blower system, which aids in the cleaning, drying, and separation of the harvested potatoes. The blower system has been illustrated in Figures 18–21, and includes a prime mover or motor 238 mounted upon the rear end portion of the main frame. The motor 238 is enclosed within a motor housing 240, said housing opening at one end, upon one side of the frame, to permit air to enter the motor housing and be driven past the motor by means of the conventional fan provided on the motor. Thus, the air passing through the housing 240 cools the motor, which motor is preferably an internal combustion engine.

Figures 18, 19, 20, 21:
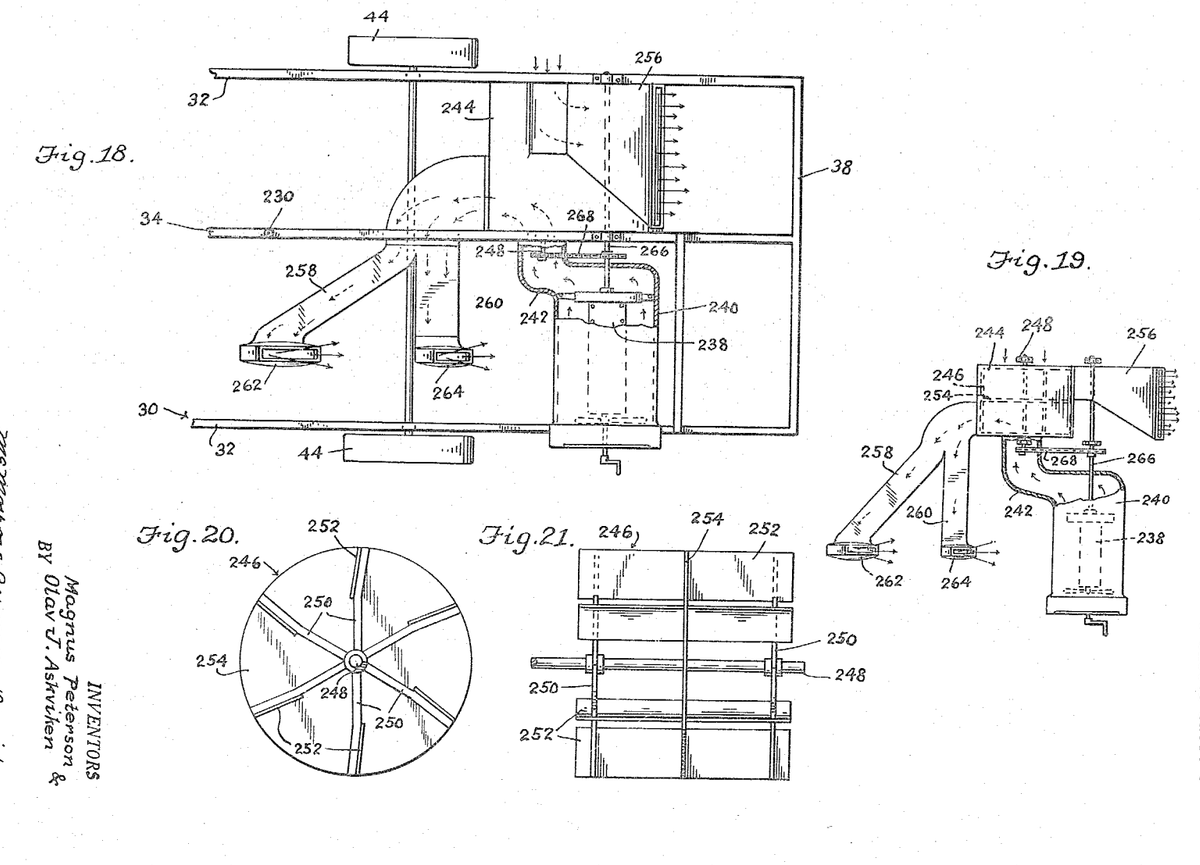
Figure 18 is a top plan view, in which portions are shown in section, of the rear end portion of the main frame per se, and of the blower system embodied in the apparatus.
Figure 19 is a top plan view, on a reduced scale, of the blower system per se.
Figure 20 is an end elevational view of the blower or fan embodied in the blower system.
Figure 21 is a side elevational view of said fan.

The air blown past the motor 238 will, naturally, become substantially heated, and will move into a motor housing extension 242. The air, moving in the direction of the arrows shown in Figure 18, travels into one side of a blower housing 244, in which is rotatably mounted a fan or blower 246 (Figures 20 and 21).

The construction of the fan 246 is of particular importance, and as will be noted, the fan is provided with a centrally disposed blower shaft 248, having at locations spaced longitudinally thereof spaced series of radially extending blade support arms 250.

Secured to and extending between the outer ends of the arms 250 of the respective series are fan blades 252, said blades extending fully from end to end of the fan.

Intermediate the opposite ends of the fan, there is provided a circular divider plate 254, said divider plate being fixedly secured to the several blades 252. The divider plate 254 causes the blower housing to be separated into a pair of chambers, one of said chambers being a warm air chamber and the other chamber being a cool air chamber.

The cool air chamber has an opening to atmosphere, and on rotation of the fan, air will be drawn in through said opening, and will be impelled through a tapered, relatively flat cool air duct 256. The outlet end of the cool air duct 256 is positioned immediately below the devining attachment 102, so as to cause a blast of cool air to be driven upwardly against the vines and potatoes to be separated, which blast will assist in the separation in the manner previously discussed herein.

The warm air chamber of the blower is in communication with the motor housing extension duct 242, and thus the warm air discharged from the motor housing 240 will be drawn into the warm air chamber of the blower housing. The rotating fan will cause said warm air to be directed into branch ducts 258, 260, the outlet ends of said ducts being positioned under the drum 146, at locations spaced longitudinally of the drum. Preferably, the outlet ends of the ducts 258, 260 are inclined in such a manner as to cause the warm air blasts emanating therefrom to be directed obliquely of the drum interior, in the direction of the inlet end of the drum.

The warm air blasts directed into the drum will assist measurably in drying the potatoes, and will further have the effect of drying the debris and vines, so as to break up clods, and condition the debris for gravitation through the slatted wall of the drum.

To drive the blower, a jack shaft 266 is drivingly connected to the shaft of the motor 238, said jack shaft having a sprocket about which is trained a sprocket chain 268, which chain drives a sprocket on the blower shaft 248.

It will be understood that the motor or prime mover 238 drives all the moving parts of the device, and has operative driving connections to the pick-up conveyor, de-vining attachment, cross conveyor, drum loading conveyor, drum, bulk loading conveyor, and blower. We believe that it is entirely possible that those skilled in the art may desire to vary the driving connections as desired, it being mainly important that the driving connections be such as to cause each of the driven assemblies to travel at a predetermined speed, relative to the assemblies associated therewith, thus to prevent jamming of the potatoes at any location, and assure the uniform, even travel of the potatoes during the processing thereof.

Referring now to Figures 27 to 31 inclusive, in these figures of the drawings the drive assembly of the apparatus is shown, the drive assembly being so designed as to cause all the driven units hereinbefore described to be powered, at selected, relative rates of speed, by the single prime mover 238.

The prime mover 238 has (Figure 27) a motor shaft 270 to which is secured a main drive sprocket 272 about which is trained a chain 274. Chain 274 is also trained about sprocket 276 secured to the jack shaft 266 mentioned previously herein. Thus, jack shaft 266 is rotated, and secured to said jack shaft is a large sprocket about which is trained the chain 268 extending to the sprocket on the blower drive shaft 248.

In this way, the blower is powered from the prime mover.

For the purpose of holding the chain 274 under proper tension, idler sprockets 278, 280 are utilized, about which chain 274 is trained.

Also secured to the jack shaft 266 is a small sprocket 282 (Figure 27) about which is trained a chain 284. Chain 284 is also trained about sprocket 286 secured to and rotating with a shaft 288. The shaft 288, like the jack shaft 266, extends transversely of the apparatus, at the rear end thereof.

Figure 27:
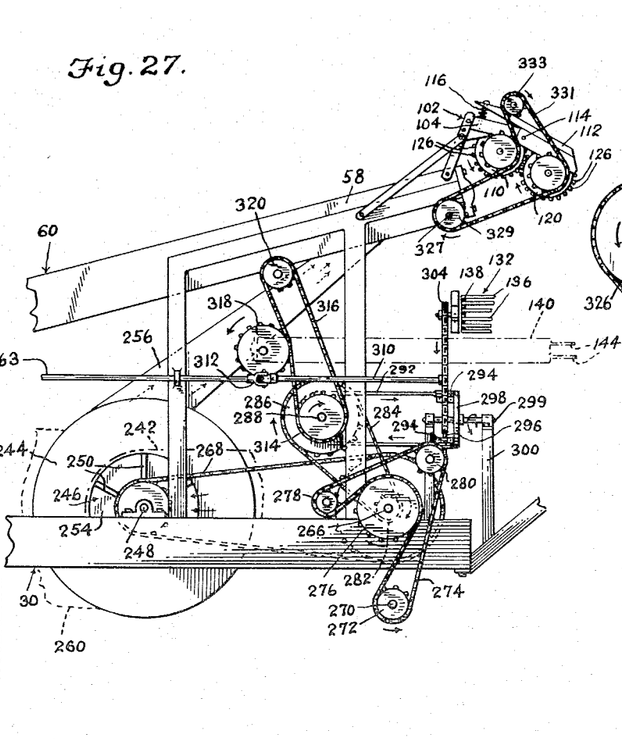
Figure 27 is a fragmentary side elevational view showing the rear end portion of the apparatus, and illustrating the drive assembly.
Figures 29, 30, 31:
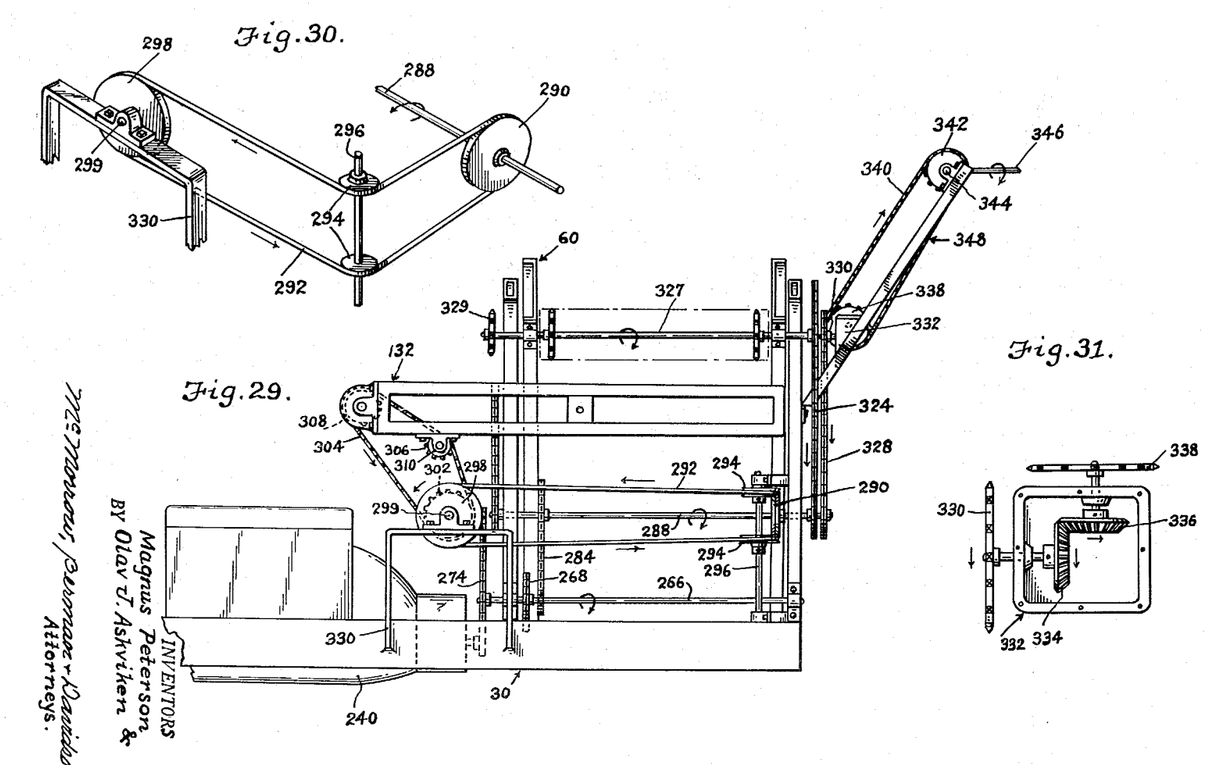
Figure 29 is a fragmentary rear elevational view of the apparatus taken from the right of Figure 27.
Figure 30 is a perspective view of a part of the drive assembly.
Figure 31 is a plan view of a gear case with the cover removed.

As will be noted primarily from Figure 30, and also from Figures 27 and 29, there is secured to the shaft 288 a pulley 290, about which is trained a belt 292.

The belt 292 is given a right angled turn, by passage thereof about horizontally disposed, vertically spaced pulleys 294 mounted upon a vertical shaft 296.

Belt 292 is then trained about a pulley 298 rotating in a plane at right angles to the plane of rotation of the pulley 290, the pulley 298 being secured to a shaft 299 journaled in a bearing mounted upon a bracket 300 of inverted U-shape, said bracket 300 being mounted upon the rear end of the apparatus.

Secured to the shaft 299, for rotation by said shaft is a sprocket 302 (see Figure 29) about which is trained a chain 304, said chain being trained about a sprocket 306 and a sprocket 308. The sprocket 308 constitutes the cross conveyor drive sprocket, and is adapted to power the cross conveyor 132 that extends transversely of the rear end of the apparatus to receive the potatoes from the de-vining means, and to carry said potatoes to the drum loading conveyor.

The sprocket 306 is secured to, and rotates a drum drive shaft 310 (Figures 27 and 29), the shaft 310 being connected by a universal joint 312 to the shaft 163 previously described herein.

In this way, the drum is driven at a selected rate of speed, during use of the apparatus constituting the present invention.

Also secured to the shaft 288, for rotation thereby, is a sprocket 314, about which is trained a chain 316, said chain driving a sprocket 318. The sprocket 318 constitutes the drum loading conveyor sprocket, and powers the drum loading conveyor 140.

The chain 316 is kept under proper tension by an idler sprocket 320.

Figure 28:
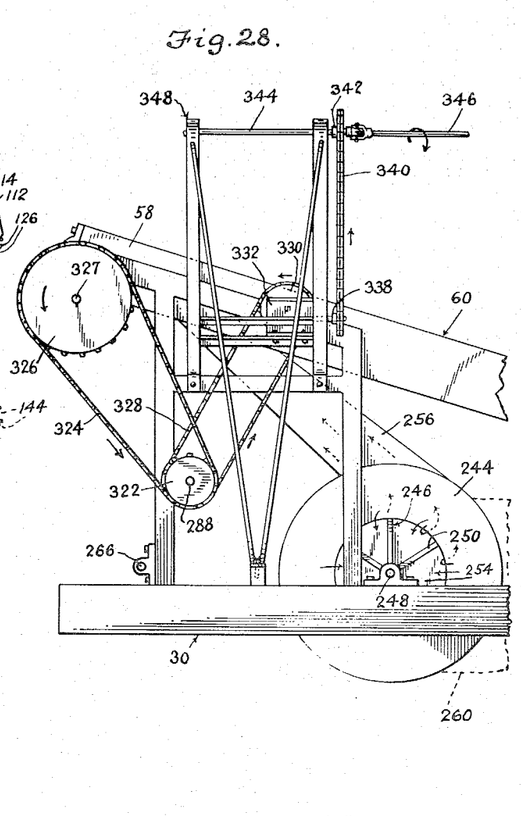
Figure 28 is a view similar to Figure 27, showing the opposite side of the apparatus.

Referring now to Figure 28, wherein is shown the means for driving the pickup conveyor 60, there is secured to the shaft 288, for rotation thereby, a sprocket 322 about which is trained a chain 324, said chain driving a sprocket 326. The sprocket 326 constitutes a drive sprocket for the pickup conveyor 60.

Sprocket 326 is secured to a shaft 327 which shaft, as shown in Figure 29, drives not only the pickup conveyor 60 but also rotates the de-vining assembly drive sprocket 329. The sprocket 329, as shown in Figure 27, has a belt 331 trained thereabout, said belt driving sprockets secured to the de-vining rollers. An idler 333 keeps the chain 331 under proper tension.

Means is also incorporated in the drive assembly for driving the bulk loading conveyor, and to this end, another sprocket is secured to the shaft 288, about which is trained a chain 328. Chain 328 is adapted to drive a sprocket 330 (Figure 28), the sprocket 330 being secured to a shaft extending into a gear box designated generally at 332 (Figure 31).

Secured to the shaft on which the sprocket 330 is mounted is a bevel gear 334, said gear being in mesh with a bevel gear 336, the bevel gear 336 being secured to and being adapted to rotate a shaft on which is carried a sprocket 338. A chain 340 is trained about the sprocket 338 (Figures 28 and 29), the chain 340 driving a sprocket 342. Sprocket 342 is secured to and rotates with a shaft 344 (Figure 28) connected by a universal joint to an elongated bulk loader drive shaft 346. The bulk loader drive shaft 346 extends to one of the shafts of the conveyor chain of the bulk loader, for the purpose of joining the same.

As will be noted from Figures 28 and 29, the gear box, shaft 344, and associated parts are mounted upon a bearing bracket designated generally at 348, said bearing bracket extending laterally and upwardly, at an incline, from one side of the apparatus.

By reason of the construction illustrated and described, it is seen that all the moving parts of the assembly, whereby the potatoes are handled, are driven from the single prime mover, by a driving linkage which is adapted to cause operation of the several units of the apparatus at selected, relative rates of speed. Obviously, the relative speeds of the several units of the apparatus will be determined according to the sizes of the several sprockets and pulleys.

We believe it to be an important characteristic of the invention that it constitutes a unitary, self-contained apparatus which will provide for a full processing of potatoes, acting upon the potatoes initially while the potatoes are still in the ground, and handling potatoes to and including the point at which they are loaded in bulk in a suitable vehicle. During the processing of the potatoes, the potatoes are fully cleaned and dried, and it is considered to be an important feature of the construction that all this is accomplished without requirement of more than one, or at the most two, attending workers. Once the apparatus has been placed in operation, and all parts properly adjusted, it is necessary only that the apparatus be drawn by a suitable traction vehicle, the apparatus operating while being so drawn without special attention being given thereto.

It will be understood, in this connection, that the pick-up conveyor can be widened as necessary, and the other parts of the apparatus formed to handle potatoes in selected quantities.

It is believed clear that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. In a mobile potato harvester a series of closely spaced support bars moving upwardly in an upwardly inclined path, means carried by the harvester adjacent the lower end of the upwardly inclined path for uprooting potatoes and depositing them together with their vines on the moving support bars, spaced vine engaging and pulling bars mounted to move in intersecting closed paths above the upwardly inclined path, and means carried by the harvester for creating an air blast and directing it upwardly through the spaces between the upwardly moving support bars and the spaces between the vine engaging and pulling bars for elevating the vines into contact with the vine engaging and pulling bars.

2. In a mobile potato harvester a foraminous conveyor moving upwardly in an upwardly inclined path, means carried by the harvester adjacent the lower end of the conveyor for uprooting potatoes and depositing them together with their vines on the conveyor, spaced vine engaging and pulling bars mounted on said conveyor to move in intersecting closed paths above the conveyor, and means carried by the harvester for creating an air blast and directing it upwardly through the upwardly moving conveyor and the spaces between the vine engaging and pulling bars for elevating the vines into contact with the vine engaging and pulling bars.

3. In a mobile potato harvester a series of closely spaced support bars moving upwardly in an upwardly inclined path, means carried by the harvester adjacent the lower end of the upwardly inclined path for uprooting potatoes and depositing them together with their vines on the moving support bars, spaced vine engaging and pulling bars mounted on said conveyor to move in intersecting closed paths above the upwardly inclined path, means carried by the harvester for creating an air blast and directing it upwardly through the spaces between the support bars and the vine engaging and pulling bars for elevating the vines into contact with the vine engaging and pulling bars, a foraminous drum mounted on the harvester for rotation about its longitudinal axis which inclines downwardly toward one end of the drum, means carried by the harvester for receiving de-vined potatoes as they leave the upwardly inclined path and delivering said potatoes into the interior of said drum through the end thereof adjacent the elevated end of its axis, means carried by the harvester and operatively connected to the air blast creating means for directing an air blast upwardly through said drum and against potatoes contained therein for removing trash and the like from said potatoes.

4. In a mobile potato harvester a conveyor for moving potatoes in an upwardly inclined path, means carried by the harvester adjacent the lower end of the upwardly inclined path for uprooting potatoes and delivering them with their vines attached onto the conveyor, spaced vine engaging and pulling bars mounted on said conveyor to move in intersecting closed paths above the conveyor, an open ended hollow foraminous potato cleaning drum mounted on the harvester adjacent the de-vining means to rotate about its longitudinal axis and receive through one open end the de-vined potatoes to tumble them and remove trash and earth therefrom, and means carried by the harvester and extending beneath the drum for creating an air blast, conduit means operatively connected to said air blast creating means for directing the air blast through the drum for dislodging and removing trash from the de-vined potatoes, and other conduit means operatively connected to said air blast creating means for directing the air blast through the upwardly moving conveyor and the space between said de-vining means for elevating the vines into contact with the de-vining means.

References Cited in the file of this patent

UNITED STATES PATENTS

| 741,136 | Hurst | Oct. 13, 1903 |
| 795,321 | Walker | July 25, 1905 |
| 1,063,834 | Schesser | June 3, 1913 |
| 1,715,218 | Wright et al. | May 28, 1929 |
| 2,209,282 | Rodin | July 23, 1940 |
| 2,168,966 | DeVries | Aug. 8, 1939 |
| 2,209,282 | Rodin | July 23, 1940 |
| 2,215,516 | Schooler | Sept. 24, 1940 |
| 2,381,172 | Lundberg | Aug. 7, 1945 |
| 2,458,887 | Winters | Jan. 11, 1949 |